(12) United States Patent
Fischer et al.

(10) Patent No.: US 8,000,711 B2
(45) Date of Patent: Aug. 16, 2011

(54) PROCEDURE FOR NON SYNCHRONIZED RADIO ACCESS (NSRA) RESOURCE ASSIGNMENT

(75) Inventors: Patrick Fischer, Bourg la Reine (FR); Remi Feuillette, Paris (FR); Dragan Vujcic, Limours (FR)

(73) Assignee: LG Electronics, Inc., Seoul (KR)

( * ) Notice: Subject to any disclaimer, the term of this patent is extended or adjusted under 35 U.S.C. 154(b) by 71 days.

(21) Appl. No.: 12/482,369

(22) Filed: Jun. 10, 2009

(65) Prior Publication Data
US 2009/0252119 A1 Oct. 8, 2009

Related U.S. Application Data

(63) Continuation of application No. 11/874,712, filed on Oct. 18, 2007.

(60) Provisional application No. 60/862,717, filed on Oct. 24, 2006.

(51) Int. Cl.
*H04W 88/02* (2009.01)
(52) U.S. Cl. .................................. 455/436; 455/439
(58) Field of Classification Search .............. 455/436, 455/450, 452.2, 455, 456.1, 456.5, 456.6
See application file for complete search history.

(56) References Cited

U.S. PATENT DOCUMENTS

| | | | |
|---|---|---|---|
| 6,558,145 B2 * | 5/2003 | Wieder | 425/107 |
| 7,551,546 B2 | 6/2009 | Ma et al. | |
| 2004/0001429 A1 | 1/2004 | Ma et al. | |
| 2004/0185884 A1 | 9/2004 | Marin et al. | |
| 2005/0221833 A1 * | 10/2005 | Granzow et al. | 455/450 |
| 2006/0003784 A1 * | 1/2006 | Chion et al. | 455/518 |
| 2007/0097908 A1 | 5/2007 | Khandekar et al. | |
| 2008/0080423 A1 * | 4/2008 | Kolding et al. | 370/329 |
| 2008/0095185 A1 | 4/2008 | DiGirolamo et al. | |
| 2008/0273503 A1 * | 11/2008 | Lee et al. | 370/336 |
| 2009/0129335 A1 * | 5/2009 | Lee et al. | 370/331 |
| 2010/0103889 A1 * | 4/2010 | Kim et al. | 370/329 |

FOREIGN PATENT DOCUMENTS

| | | |
|---|---|---|
| RU | 2214686 | 10/2003 |
| RU | 2304348 | 8/2007 |
| WO | 2004-030392 | 4/2004 |
| WO | 2008-051466 | 5/2008 |

OTHER PUBLICATIONS

3GPP, "Universal Mobile Telecommunications System (UMTS); Physical Layer Procedures (FDD) (3GPP TS 25.214 v7.2.0 Release 7)," ETSI TS 125 214, XP-014035552, Sep. 2006.
3GPP, "3rd Generation Partnership Project; Technical Specification Group Radio Access Network; Services Provided by the Physical Layer," 3G TS 25.302 v3.3.0, XP-050114467, Jan. 2000.

* cited by examiner

*Primary Examiner* — Diane Mizrahi
(74) *Attorney, Agent, or Firm* — Lee, Hong, Degerman, Kang & Waimey

(57) ABSTRACT

A procedure for RACH initial access in a mobile terminal is provided such that necessary information is conveyed the for the initial access procedure with less overhead. The method allow an accurate choice of the uplink transport format by allowing the mobile terminal to determine by itself whether a certain transport format may be used for the transmission of a message prior to the first preamble transmission and prior to the power ramping.

11 Claims, 8 Drawing Sheets

Random Access procedure for E-UTRAN initial access

Structure of the physical channel

Random Access procedure for E-UTRAN initial access**

MOBILE STATION/ACCESS TERMINAL

US 8,000,711 B2

PROCEDURE FOR NON SYNCHRONIZED RADIO ACCESS (NSRA) RESOURCE ASSIGNMENT

CROSS-REFERENCE TO RELATED APPLICATIONS

This application is a continuation of currently pending U.S. application Ser. No. 11/874,712, filed Oct. 18, 2007, which pursuant to 35 U.S.C. §120, claims the benefit of U.S. Provisional Application Ser. No. 60/862,717 filed on Oct. 24, 2006, the contents of which are hereby incorporated by reference herein in their entirety.

FIELD OF THE INVENTION

The present invention is directed to a RACH initial access procedure in a UE, and particularly, to a method for conveying the information necessary for the initial access procedure with less overhead.

DESCRIPTION OF THE RELATED ART

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

FIG. 1 is a block diagram illustrating network structure of an evolved universal mobile telecommunication system (E-UMTS). The E-UMTS may be also referred to as an LTE system. The communication network is widely deployed to provide a variety of communication services such as voice and packet data.

As illustrated in FIG. 1, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also be referred to as a mobile station (MS), a user terminal (UT), a subscriber station (SS) or a wireless device.

An eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including distribution of paging messages to eNodeBs 20, security control, idle state mobility control, SAE bearer control, and ciphering and integrity protection of non-access stratum (NAS) signaling. The SAE gateway host provides assorted functions including termination of U-plane packets for paging reasons, and switching of the U-plane to support UE mobility. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

FIG. 2 is a block diagram depicting architecture of a typical E-UTRAN and a typical EPC. As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

FIGS. 3(a) and 3(b) are block diagrams depicting the user-plane protocol and the control-plane protocol stack for the E-UMTS. As illustrated, the protocol layers may be divided into a first layer (L1), a second layer (L2) and a third layer (L3) based upon the three lower layers of an open system interconnection (OSI) standard model that is well known in the art of communication systems.

The physical layer, the first layer (L1), provides an information transmission service to an upper layer by using a physical channel. The physical layer is connected with a medium access control (MAC) layer located at a higher level through a transport channel, and data between the MAC layer and the physical layer is transferred via the transport channel. Between different physical layers, namely, between physical layers of a transmission side and a reception side, data is transferred via the physical channel.

The MAC layer of Layer 2 (L2) provides services to a radio link control (RLC) layer (which is a higher layer) via a logical channel. The RLC layer of Layer 2 (L2) supports the transmission of data with reliability. It should be noted that the RLC layer illustrated in FIGS. 3(a) and 3(b) is depicted because if the RLC functions are implemented in and performed by the MAC layer, the RLC layer itself is not required. The PDCP layer of Layer 2 (L2) performs a header compression function that reduces unnecessary control information such that data being transmitted by employing Internet protocol (IP) packets, such as IPv4 or IPv6, can be efficiently sent over a radio (wireless) interface that has a relatively small bandwidth.

A radio resource control (RRC) layer located at the lowest portion of the third layer (L3) is only defined in the control plane and controls logical channels, transport channels and the physical channels in relation to the configuration, reconfiguration, and release of the radio bearers (RBs). Here, the RB signifies a service provided by the second layer (L2) for data transmission between the terminal and the UTRAN.

As illustrated in FIG. 3(a), the RLC and MAC layers (terminated in an eNodeB 20 on the network side) may perform functions such as Scheduling, Automatic Repeat Request (ARQ), and Hybrid Automatic Repeat Request (HARQ). The PDCP layer (terminated in eNodeB 20 on the network side) may perform the user plane functions such as header compression, integrity protection, and ciphering.

As illustrated in FIG. 3(b), the RLC and MAC layers (terminated in an eNodeB 20 on the network side) perform the same functions as for the control plane. As illustrated, the RRC layer (terminated in an eNodeB 20 on the network side) may perform functions such as broadcasting, paging, RRC connection management, Radio Bearer (RB) control, mobility functions, and UE measurement reporting and controlling. The NAS control protocol (terminated in the MME of gateway 30 on the network side) may perform functions such as a SAE bearer management, authentication, LTE_IDLE mobility handling, paging origination in LTE_IDLE, and security control for the signaling between the gateway and UE 10.

The NAS control protocol may use three different states; first, a LTE_DETACHED state if there is no RRC entity; second, a LTE_IDLE state if there is no RRC connection while storing minimal UE information; and third, an LTE_ACTIVE state if the RRC connection is established. Also, the RRC state may be divided into two different states such as a RRC_IDLE and a RRC_CONNECTED.

In RRC_IDLE state, the UE 10 may receive broadcasts of system information and paging information while the UE specifies a Discontinuous Reception (DRX) configured by NAS, and the UE has been allocated an identification (ID) which uniquely identifies the UE in a tracking area. Also, in RRC-IDLE state, no RRC context is stored in the eNodeB.

In RRC_CONNECTED state, the UE 10 has an E-UTRAN RRC connection and a context in the E-UTRAN, such that transmitting and/or receiving data to/from the network (eNodeB) becomes possible. Also, the UE 10 can report channel quality information and feedback information to the eNodeB.

In RRC_CONNECTED state, the E-UTRAN knows the cell to which the UE 10 belongs. Therefore, the network can transmit and/or receive data to/from UE 10, the network can control mobility (handover) of the UE, and the network can perform cell measurements for a neighboring cell.

In RRC_IDLE mode, the UE 10 specifies the paging DRX (Discontinuous Reception) cycle. Specifically, the UE 10 monitors a paging signal at a specific paging occasion of every UE specific paging DRX cycle.

The paging occasion is a time interval during which a paging signal is transmitted. The UE 10 has its own paging occasion.

A paging message is transmitted over all cells belonging to the same tracking area. If the UE 10 moves from one tracking area to another tracking area, the UE will send a tracking area update message to the network to update its location.

A physical channel transfers signaling and data between layer L1 of a UE and eNB. As illustrated in FIG. 4, the physical channel transfers the signaling and data with a radio resource, which consists of one or more sub-carriers in frequency and one more symbols in time.

One sub-frame, which is 1.0 ms. in length, consists of several symbols. The particular symbol(s) of the sub-frame, such as the first symbol of the sub-frame, can be used for the L1/L2 control channel. The L1/L2 control channel carries L1/L2 control information, such as signaling.

A transport channel transfers signaling and data between the L1 and MAC layers. A physical channel is mapped to a transport channel.

Downlink transport channel types include a Broadcast Channel (BCH), a Downlink Shared Channel (DL-SCH), a Paging Channel (PCH) and a Multicast Channel (MCH). The BCH is used for transmitting system information. The DL-SCH supports HARQ, dynamic link adaptation by varying the modulation, coding and transmit power, and both dynamic and semi-static resource allocation. The DL-SCH also may enable broadcast in the entire cell and the use of beamforming. The PCH is used for paging a UE. The MCH is used for multicast or broadcast service transmission.

Uplink transport channel types include an Uplink Shared Channel (UL-SCH) and Random Access Channel(s) (RACH). The UL-SCH supports HARQ and dynamic link adaptation by varying the transmit power and potentially modulation and coding. The UL-SCH also may enable the use of beamforming. The RACH is normally used for initial access to a cell.

The MAC sublayer provides data transfer services on logical channels. A set of logical channel types is defined for different data transfer services offered by MAC. Each logical channel type is defined according to the type of information transferred.

Logical channels are generally classified into two groups. The two groups are control channels for the transfer of control plane information and traffic channels for the transfer of user plane information.

Control channels are used for transfer of control plane information only. The control channels provided by MAC include a Broadcast Control Channel (BCCH), a Paging Control Channel (PCCH), a Common Control Channel (CCCH), a Multicast Control Channel (MCCH) and a Dedicated Control Channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by MAC include a Dedicated Traffic Channel (DTCH) and a Multicast Traffic Channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include a DCCH that can be mapped to UL-SCH and a DTCH that can be mapped to UL-SCH. Downlink connections between logical channels and transport channels include a BCCH that can be mapped to BCH, a PCCH that can be mapped to PCH, a DCCH that can be mapped to DL-SCH, and a DTCH that can be mapped to DL-SCH.

It is known that different cause values may be mapped on the signature sequence used to send messages between a UE and eNB and that either Channel Quality Indicator (CQI) or path loss and cause or message size are candidates for inclusion in the initial preamble. FIG. 5 illustrates different messages exchanged between a UE and eNB during initial access.

When a UE wishes to access the network and determines a message to be transmitted, the message may be linked to a purpose and a cause value may be determined. The size of the ideal message number 3 illustrated in FIG. 5 may also be determined by identifying all optional information and different alternative sizes, such as by removing optional information, or an alternative "scheduling request" message may be used.

The UE acquires necessary information for the transmission of the preamble, UL interference, Pilot Transmit power and required Signal-to-Noise Ratio (SNR) for the preamble detection at the receiver or combinations thereof. This information must allow the calculation of the initial transmit power of the preamble. It is beneficial to transmit the uplink message in the vicinity of the preamble from a frequency point of view in order to ensure that the same channel is used for the transmission of the message.

The UE should take into account the uplink interference and the uplink path loss in order to ensure that the network receives the preamble with a minimum SNR. The uplink interference can be determined only in the ENodeB and, therefore, must be broadcast by the ENodeB and received by the UE prior to the transmission of the preamble. The uplink path loss can be considered to be similar to the downlink path loss and can be estimated by the UE from the received Rx (receiver) signal strength when the transmit power of some pilot sequence of the cell is known to the UE.

The required uplink SNR for the detection of the preamble would typically depend on the NodeB configuration, such as a number of Rx antennas and receiver performance. There may be advantages to transmitting the rather static Transmit power of the pilot and the necessary uplink SNR separately form the varying uplink interference and possibly the power offset required between the preamble and the message.

The initial transmission power of the preamble can be roughly calculated according to the following formula:

Transmit power=TransmitPilot−RxPilot+ULInterference+Offset+SNRRequired.

Therefore, any combination of SNRRequired, ULInterference, TransmitPilot and Offset can be broadcast. In principle, only one value must be broadcast. This is essentially the method in current UMTS systems, although the UL interference in LTE will mainly be neighboring cell interference that is probably more constant than in UMTS.

The UE determines the initial uplink transmit power for the transmission of the preamble as explained above. The receiver in the eNB is able to estimate the absolute received power as well as the relative received power compared to the interference in the cell. The eNB will consider a preamble detected if the received signal power compared to the interference is above an eNB known threshold.

The UE performs power ramping in order to ensure that a UE can be detected even if the initially estimated transmission power for the preamble is not adequate. Another preamble will most likely be transmitted if no acknowledgement or a negative acknowledgement is received by the UE before the next random access attempt. The transmit power of the preamble can be increased, and/or the preamble can be transmitted on a different uplink frequency in order to increase the probability of detection. Therefore, the actual transmit power of the preamble that will be detected does not necessarily correspond to the initial transmit power of the preamble as initially calculated by the UE.

The UE must determine the possible uplink transport format The transport format, which may include Modulation and Coding Scheme (MCS) and a number of resource blocks that should be used by the UE, depends mainly on two parameters, specifically the SNR at the eNB and the required size of the message to be transmitted.

In practice, a maximum UE message size, or payload, and a required minimum SNR correspond to each transport format. In UMTS, the UE determines before the transmission of the preamble whether a transport format can be chosen for the transmission according to the estimated initial preamble transmit power, the required offset between preamble and the transport block, the maximum allowed or available UE transmit power, a fixed offset and additional margin. The preamble in UMTS need not contain any information regarding the transport format selected by the UE since the network does not need to reserve time and frequency resources and, therefore, the transport format is indicated together with the transmitted message.

The eNB must be aware of the size of the message that the UE intends to transmit and the SNR achievable by the UE in order to select the correct transport format upon reception of the preamble and then reserve the necessary time and frequency resources. Therefore, the eNB cannot estimate the SNR achievable by the UE according to the received preamble because the UE transmit power compared to the maximum allowed or possible UE transmit power is not known to the eNB, given that the UE will most likely consider the measured path loss in the downlink or some equivalent measure for the determination of the initial preamble transmission power.

The eNB could calculate a difference between the path loss estimated in the downlink compared and the path loss of the uplink. However, this calculation is not possible if power ramping is used and the UE transmit power for the preamble does not correspond to the initially calculated UE transmit power. Furthermore, the precision of the actual UE transmit power and the transmit power at which the UE is intended to transmit is very low. Therefore, it has been proposed to code the path loss or CQI estimation of the downlink and the message size or the cause value in the uplink in the signature.

SUMMARY OF THE INVENTION

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

In one aspect of the present invention, a method of establishing a communication link between a mobile terminal and a network is provided. The method includes identifying at least two groupings of signatures for accessing the network, each of the at least two groupings representing at least one combination of at least one transport format and at least one radio condition, selecting a signature from one of the at least two groupings, the selection according to one of the represented combinations and requesting access to the network using the selected signature.

It is contemplated that each of the at least one radio condition includes one of required uplink transmit power, reception quality of downlink signals, uplink interference, available power headroom and an anticipated difference between maximum allowed uplink transmit power and uplink transmit power. It is further contemplated that no specific combination of at least one transport format and at least one radio condition is represented by both of the at least two groups.

It is contemplated that the method further includes receiving an indication of the at least two groupings of signatures. It is further contemplated that the method further includes receiving a response acknowledging receipt of the access request, the response including resources for accessing the network and transmitting data using the resources.

It is further contemplated that selecting a signature from one of the at least two groupings includes determining an amount of data to transmit and allowable power headroom. It is further contemplated that determining an amount of data to transmit includes at least one of determining alternate message sizes for transmitting data and removing optional information from the data.

It is contemplated that the method further includes not receiving a response acknowledging receipt of the access request within a specified amount of time and requesting access to the network again using a signature re-selected from one of the at least two groupings according to one of the represented combinations. It is further contemplated that the signature is re-selected from one of the at least two groupings according to whether a represented combination of at least one transport format and at least one radio condition can accommodate an increase in transmission power of the access request.

It is contemplated that re-selecting a signature from one of the at least two groupings includes determining an amount of data to transmit and allowable power headroom. It is further contemplated that determining an amount of data to transmit includes at least one of determining alternate message sizes for transmitting data and removing optional information from the data.

It is contemplated that the method further includes not receiving a response acknowledging receipt of the access request within a specified amount of time and requesting access to the network again using the selected signature. It is further contemplated that the method further includes receiving a response acknowledging receipt of the access request, the response including resources for accessing the network and an indication that the transmission power of the access request was higher than necessary and transmitting data using the resources, the data transmitted at a power that is lower than the power obtained by applying an offset to the transmission power of the access request, the offset identified by a transport format represented by the grouping from which the signature was selected.

It is contemplated that two groupings are identified, each grouping including signatures, and requesting access to the network includes transmitting a preamble according to the selected signature. It is further contemplated that each of the at least one transport format identifies a modulation and coding scheme, a number of resource blocks and a maximum payload.

In another aspect of the present invention, a method of establishing a communication link between a mobile terminal and a network is provided. The method includes identifying at least two groupings of signatures for accessing the network, each of the at least two groupings representing at least one combination of at least one transport format and at least one radio condition, receiving an access request from the mobile terminal, identifying one of the at least two groupings to which a signature used to transmit the access request belongs. Preferably, the method further includes allocating resources to the mobile terminal according to the identified grouping.

In another aspect of the present invention, a mobile terminal for establishing a communication link with a network is provided. The mobile terminal includes a transmitting/receiving unit transmitting an access request to the network, a display unit displaying user interface information, an input unit receiving inputs from a user and a processing unit identifying at least two groupings of signatures for accessing the network, selecting a signature from one of the at least two groupings and controlling the transmitting/receiving unit to request access to the network by generating an access request message using the selected signature, wherein each of the at least two groupings represents at least one combination of at least one transport format and at least one radio condition and the selection of the signature is according to one of the represented combinations.

It is contemplated that each of the at least one radio condition includes one of required uplink transmit power, reception quality of downlink signals, uplink interference, available power headroom and an anticipated difference between maximum allowed uplink transmit power and uplink transmit power. It is further contemplated that no specific combination of at least one transport format and at least one radio condition is represented by both of the at least two groups.

It is contemplated that the transmitting/receiving unit receives an indication of the at least two groupings of signatures. It is further contemplated that the transmitting/receiving unit receives a response acknowledging receipt of the access request, the response including resources for accessing the network, and the processing unit controls the transmitting/receiving unit to transmit data using the resources.

It is contemplated that the processing unit selects the signature from one of the at least two groupings by determining an amount of data to transmit and allowable power headroom. It is further contemplated that the processing unit determines the amount of data to transmit by at least one of determining alternate message sizes for transmitting data and removing optional information from the data.

It is contemplated that the processing unit controls the transmitting/receiving unit to request access to the network again upon not receiving a response acknowledging receipt of the access request within a specified amount of time, the access request performed using a signature re-selected from one of the at least two groupings according to one of the represented combinations. It is further contemplated that the processing unit re-selects the signature from one of the at least two groupings according to whether a represented combination of at least one transport format and at least one radio condition can accommodate an increase in transmission power of the access request.

It is contemplated that the processing unit re-selects the signature from one of the at least two groupings by determining an amount of data to transmit and allowable power headroom. It is further contemplated that the processing determines the amount of data to transmit by at least one of determining alternate message sizes for transmitting data and removing optional information from the data.

It is contemplated that the processing unit controls the transmitting/receiving unit to request access to the network again upon not receiving a response acknowledging receipt of the access request within a specified amount of time, the access request performed using the selected signature. It is further contemplated that the transmitting/receiving unit receives a response acknowledging receipt of the access request, the response including resources for accessing the network and an indication that the transmission power of the access request was higher than necessary, and the processing unit controls the transmitting/receiving unit to transmit data using the resources, the data transmitted at a power that is lower than the power obtained by applying an offset to the transmission power of the access request, the offset identified by a transport format represented by the grouping from which the signature was selected.

It is contemplated that two groupings are identified, each grouping including signatures, and the processing unit controls the transmitting/receiving unit to request access to the network by generating a preamble according to the selected signature. It is further contemplated that each of the at least one transport format identifies a modulation and coding scheme, a number of resource blocks and a maximum payload.

In another aspect of the present invention, a network for establishing a communication link with a mobile terminal is provided. The network includes a receiver receiving an access request from the mobile terminal and a controller identifying at least two groupings of signatures for accessing the network, each of the at least two groupings representing at least one combination of at least one transport format and at least one radio condition and identifying one of the at least two groupings to which a signature used to transmit the access request belongs. Preferably, the controller further allocates resources to the mobile terminal according to the identified grouping.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

FIG. 3(a) illustrates the control-plane protocol stack for the E-UMTS.

DETAILED DESCRIPTION OF THE PREFERRED EMBODIMENTS

Reference will now be made in detail to the preferred embodiments of the present invention, examples of which are illustrated in the accompanying drawings. The present invention is directed to a RACH initial access procedure in a UE.

The present invention proposes a method to allow an accurate choice of the UL transport format. The new method allows the UE to determine by itself whether a certain transport format may be used for the transmission of message 3 in FIG. 5 prior to the first preamble transmission and prior to the power ramping.

Figure 1:
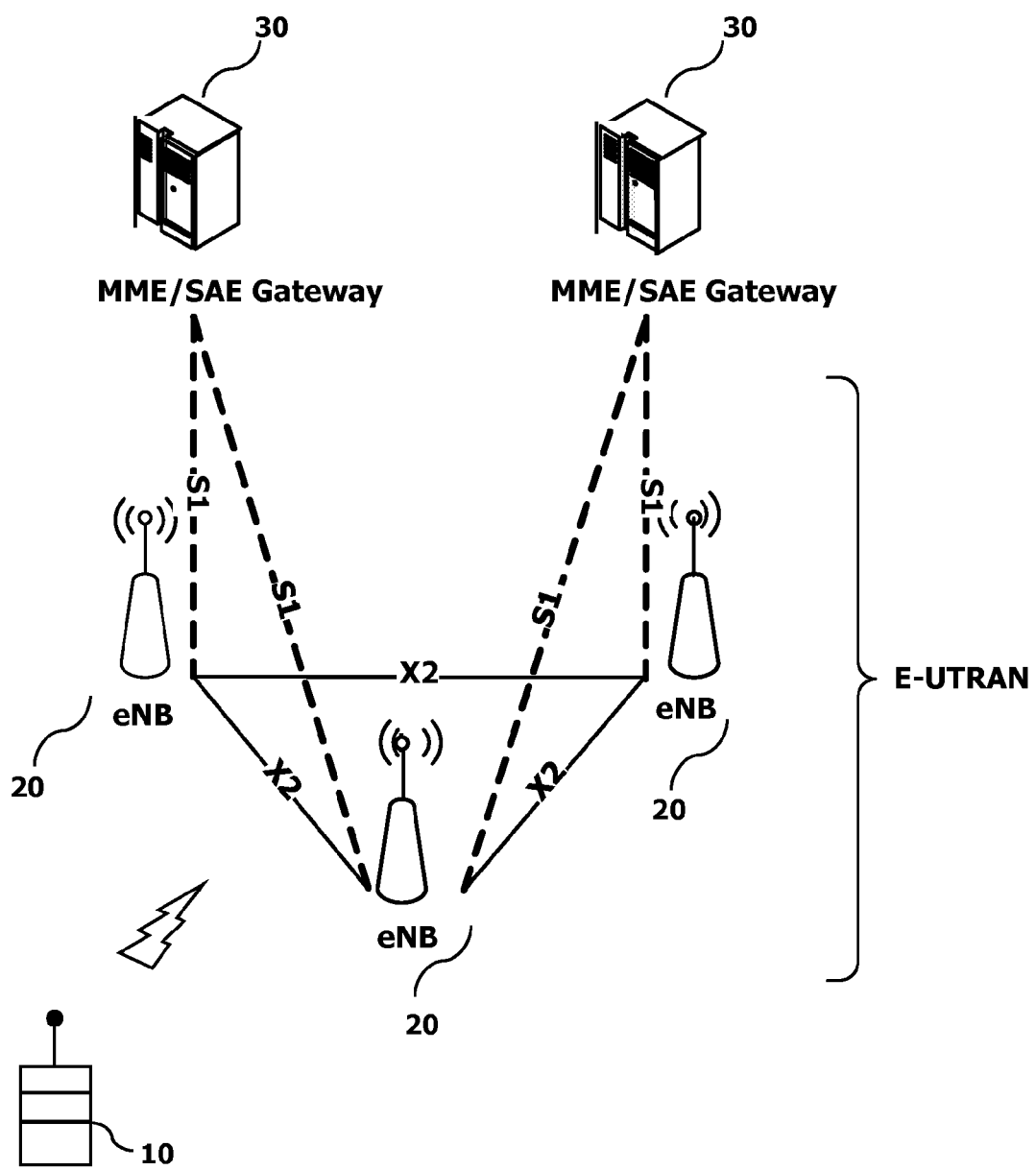
FIG. 1 illustrates a block diagram illustrating network structure of an evolved universal mobile telecommunication system (E-UMTS).
Figure 2:
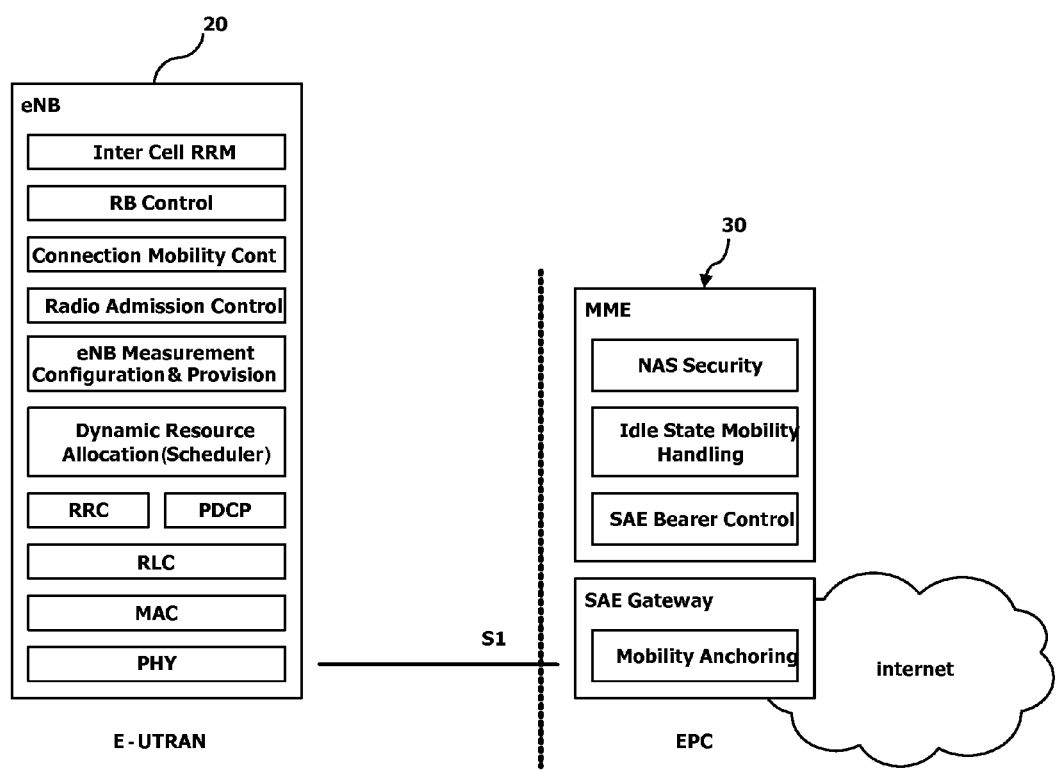
FIG. 2 illustrates a block diagram depicting architecture of a typical E-UTRAN and a typical EPC.
Figure 3A:
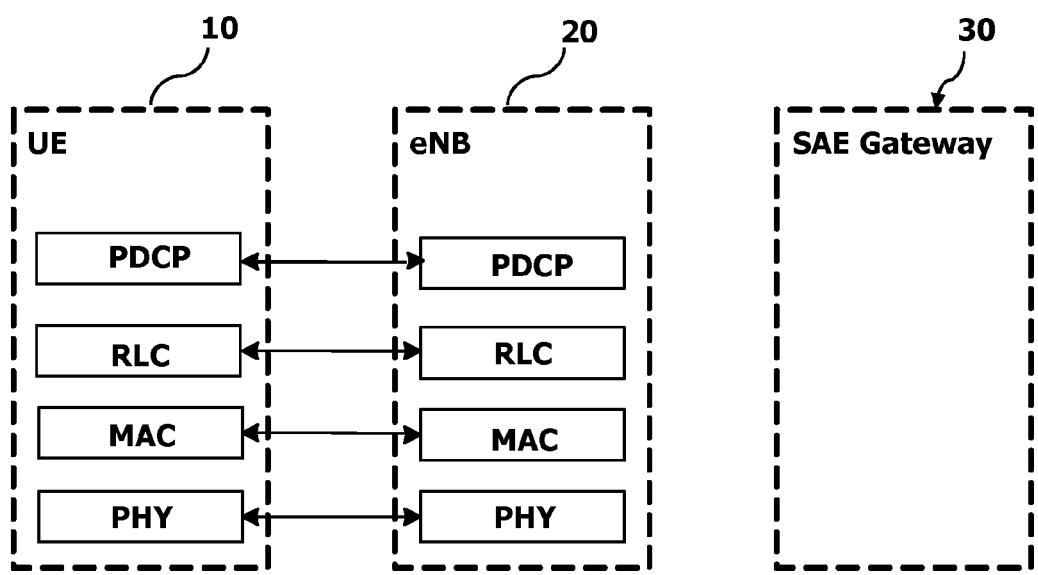
FIG. 3(a) illustrates the user-plane protocol for the E-UMTS.
Figure 3B:
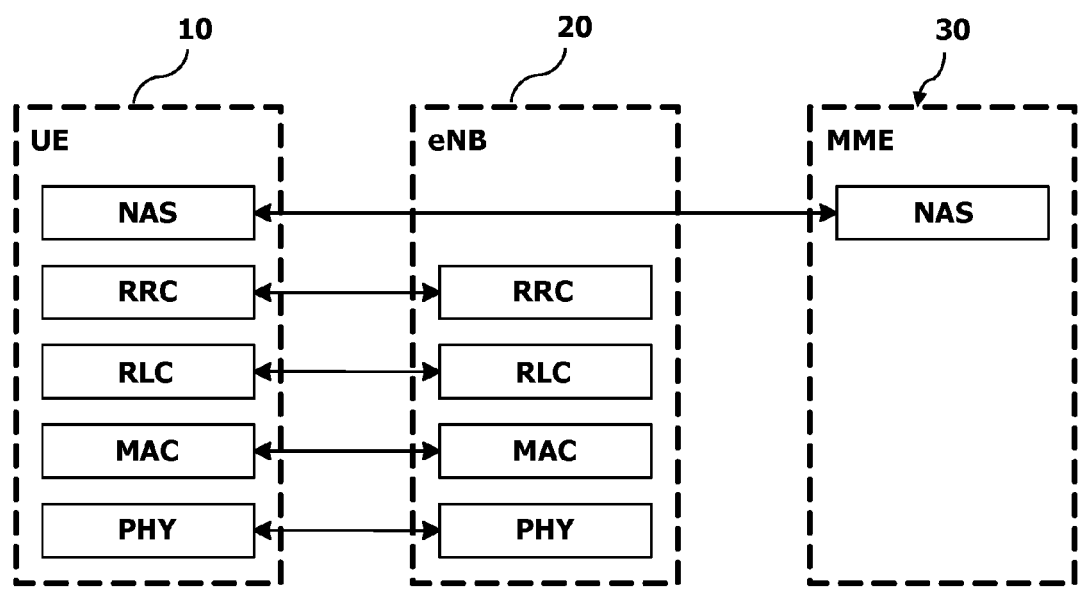
Figure 4:
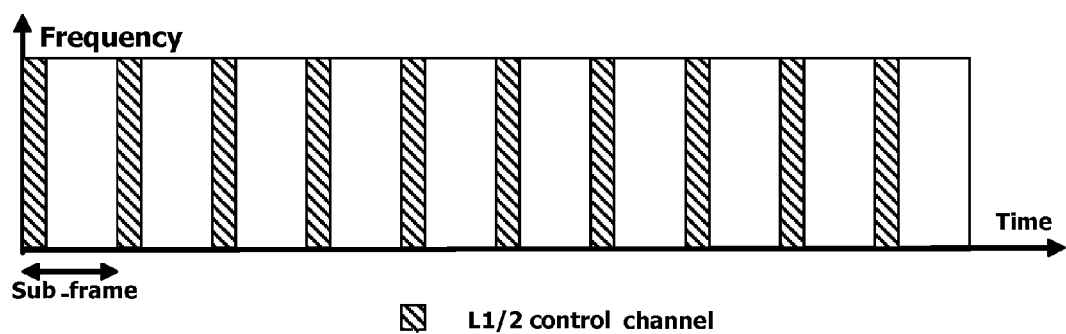
FIG. 4 illustrates a Structure of the physical channel.
Figure 5:
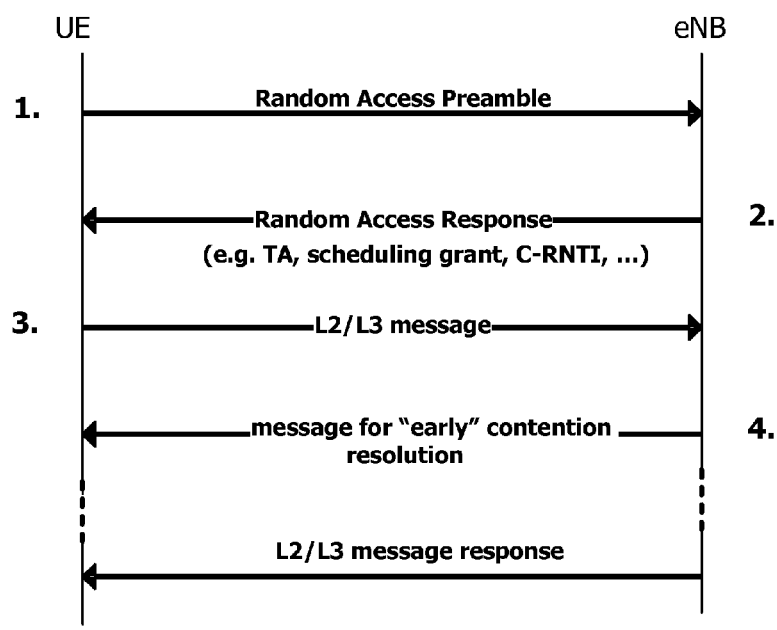
FIG. 5 illustrates a Random Access procedure for E-UTRAN initial access.

The UE determines the transmit power for message 3 in FIG. 5 based on the transmit power of the preamble that has been detected by the eNB. It is clear that a minimum SNR is necessary for the successful transmission of an UL message, such as message 3 in FIG. 5. At the same time, it is necessary that the preamble, such as message 1 in FIG. 5, be received with a certain SNR in order to be considered as successfully received by the NodeB.

The eNB knows the SNR required for successful detection of the preamble since the SNR necessary for message 3 for each available transport format is also known by the eNB. The eNB can indicate an offset for transmission of message 3 compared to the transmission power of the preamble, the offset indicated even before the preamble is detected.

The present invention takes into account more aspects of the potential procedure for the NSRA and considers how the information included in messages may be reduced through linking the physical procedure and the MAC behavior while still conveying the necessary information.

A fixed or broadcast margin may be used as the offset relative to the estimated initial preamble transmission power. This is possible because the UE knows the currently used transmit power for the preamble, the maximum available or allowed transmit power. Alternatively, the UE may re-evaluate which transport format may be transmitted prior to each transmission of a preamble, assuming that the eNB detects the preamble.

According to the present invention, it is essentially the UE that determines which of the available transport formats are available for transmission before each transmission of the preamble. This reduces sensitivity to an erroneous estimation of the necessary transmit power necessary for detection of the preamble.

A UE would then only determine a transport format that it is able to transmit. The determination is made according to the transmit power of the preamble that the UE will use, the difference between preamble transmit power and the required power for transmission of message 3 as indicated by the eNB, and the maximum available or allowed UE Transmit power.

The eNB need not check whether the UE transmit power is sufficient when a UE indicates a signature corresponding to a certain transport format for transmission. This is because the detection of the UE already implies that the UE transmit power and the uplink channel quality is sufficient to transmit the required transport format.

Therefore, the only information that the signature must indicate is the transport format that the UE requests to use and further information, such as CQI or path loss, need not be coded in the preamble in order to determine the possible transport formats for transmission of message 3. Furthermore, the eNB may indicate an additional offset in message 2 for the transmission of message 3 compared to the transmission power of the preamble if the transmit power chosen by the UE results in a higher SNR in the eNB than is needed for detection. It is beneficial to transmit the uplink message in vicinity of the preamble from a frequency point of view in order to ensure that the same channel is used for the transmission of the message.

Figure 6:
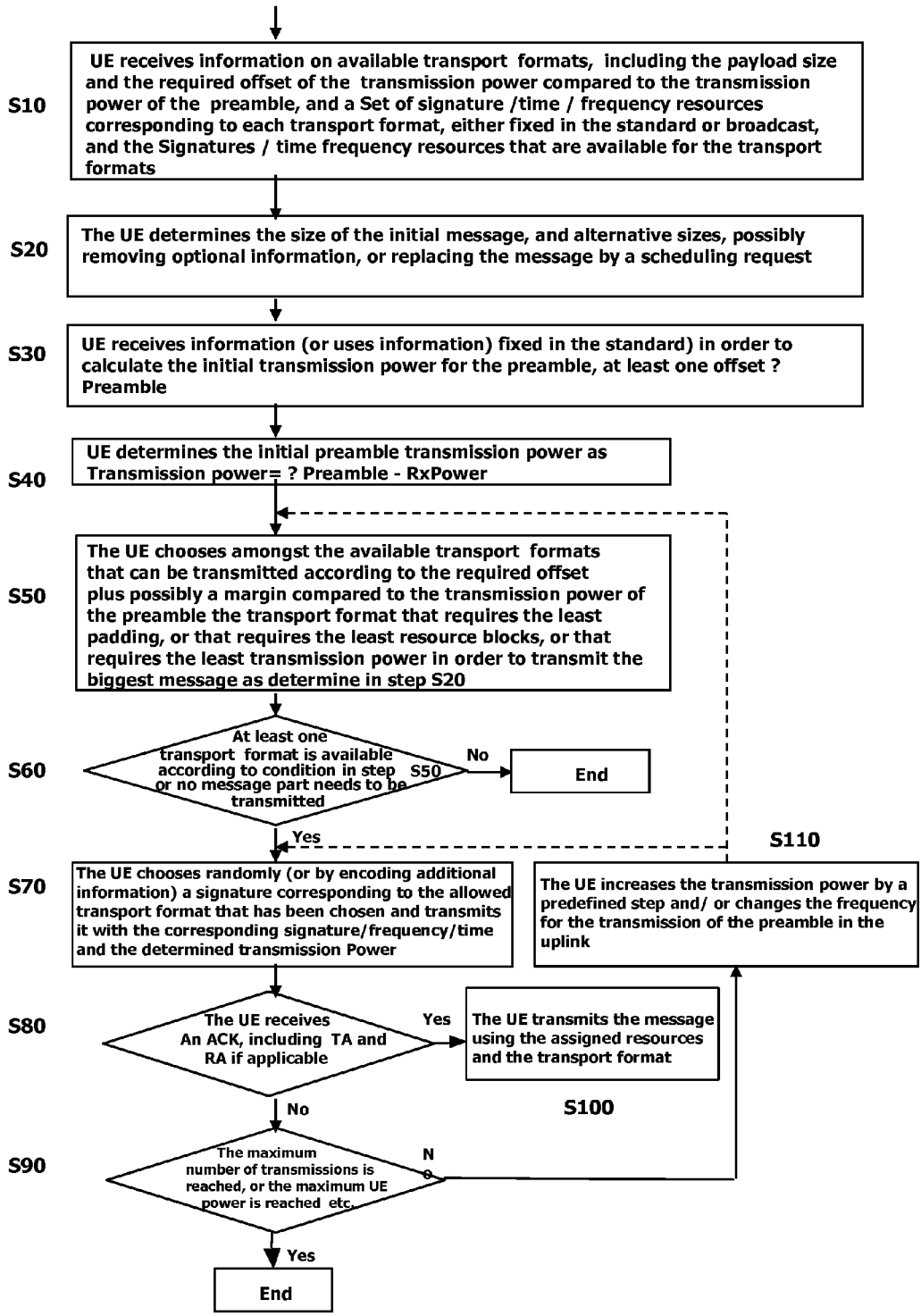
FIG. 6 illustrates a random access procedure according to the present invention.

FIG. 6 illustrates a random access procedure according to the present invention. As illustrated in FIG. 6, the necessary information for the calculation of the preamble is gathered in steps S10 to S40 in order to ensure detection of the initial preamble and prepare a message, if any, for transmission.

The information that is needed in the UE includes any combination of uplink interference, pilot transmit power, required SNR and possibly additional offsets in order to calculate the necessary preamble transmit power based on the measured received pilot receive power as well as allowed transport formats for transmission of a RACH message in the uplink, offsets related to the power with which the preamble has been transmitted for each transport format, and information related to power ramping for successive preamble transmissions. Transport formats should include at least the available payload size, but other information, such as coding type and necessary time/frequency resources, may be included.

One additional margin, or a specific margin per transport format, is necessary if the estimation of the allowed transport formats for the uplink is done only once prior to the transmission of the initial preamble. This allows the UE to determine whether a transport format may be transmitted including a margin for eventual power ramping based on the estimated initial preamble transmission power. Signature/time/frequency resources associated with each transport format should also be made available, specifically if no message needs to be transmitted.

The needed information may either be broadcast on the system information in a cell or fixed in a standard. The order in which steps S10 to S40 are performed is interchangeable.

The UE determines in step S50 which transport formats may be used based on the transmission power that will be used for the transmission of the preamble. This determination may be performed once before the transmission of the first preamble, with a set of possible transport formats identified by the UE according to the transport formats for which the following equation is fulfilled:

$$\text{Offset}_{TFi}+\text{Margin}_{TFi}<P_{Max}-P_{Preamble}$$

Alternatively the determination may be performed before each transmission of the preamble. In this case, the available set of possible transport formats may change during the procedure if the transmit power is increased or if parameters, such as the uplink interference value, change.

The UE then chooses from the possible transport formats the transport format that allows the largest version of the message that should be transmitted. The transport format that requires the least transmit power, adds the least padding, or uses the least time/frequency resources may be chosen if several transport formats are possible.

It is not necessary that the possible transport formats be determined prior to choosing the transport format that best suits the message size. The suitable transport formats may be determined first and then which of the suitable transport formats may be used is determined based on the initial power estimation.

As illustrated in step S60, the RACH procedure is ended unsuccessfully if no transport format can be chosen that allows transmission of at least the smallest version of the message based on the determined preamble transmit power. As illustrated in step S70, the UE then selects a signature and a time/frequency resource for transmission from a set corresponding to the selected transport format if a suitable transport format has been identified.

Different transport formats might be coded on the same group of signatures, for example, if the time/frequency resources required are the same. A specific set of signatures and time/frequency resources could be reserved for when no message part is supposed to be transmitted and a UE that has no message to be transmitted can choose a signature from this set.

It is determined in step S80 whether the UE receives an ACK. The ACK may include a timing advance value and an uplink resource assignment.

The UE transmits the message using the determined transport format, as illustrated in step S100, if an ACK is received. An additional offset, such as $\text{Off}_{overshoot}$, may be included in the ACK if the eNB detects that the transmission power of the preamble exceeds the threshold. In this case, the message is sent with a power determined according to the following equation:

$$P_{Tx}=P_{Preamble}+\text{Offset}_{TFi}-\text{Off}_{Overshoot}$$

The UE determines whether to stop the procedure unsuccessfully or continue with the preamble transmission at another occasion, as illustrated in step S90, if a negative acknowledgement or no acknowledgement is received from the eNB. If it is determined to continue with the preamble transmission at another occasion, the UE will increase its preamble transmission power if applicable and/or change the frequency resources used for the transmission of the next preamble, as illustrated in step S110. Depending upon whether the UE determines the uplink transport format at each transmission of the preamble or whether uplink transport format is determined only once for the transmission of the first preamble, the process then returns to either step S50 or S0.

Two possible methods are contemplated. The UE may determine a transport format for use based on the message size and transport format information and associated offsets and, possibly, a margin compared to the transmission power of the initial or the next preamble, with transport format information and offset information either broadcast on system information or fixed in a standard. On the other hand, the UE may choose the signature and time/frequency resources for the preamble transmission based on a chosen transport format, where each transport format corresponds to a set of signatures and time/frequency resources that are either fixed in a standard or broadcast by the eNB and from which the UE chooses randomly or based on other criteria. Different transport formats may use the same set of signatures if, for example, different transport formats require the same time/frequency resources.

Figure 7:
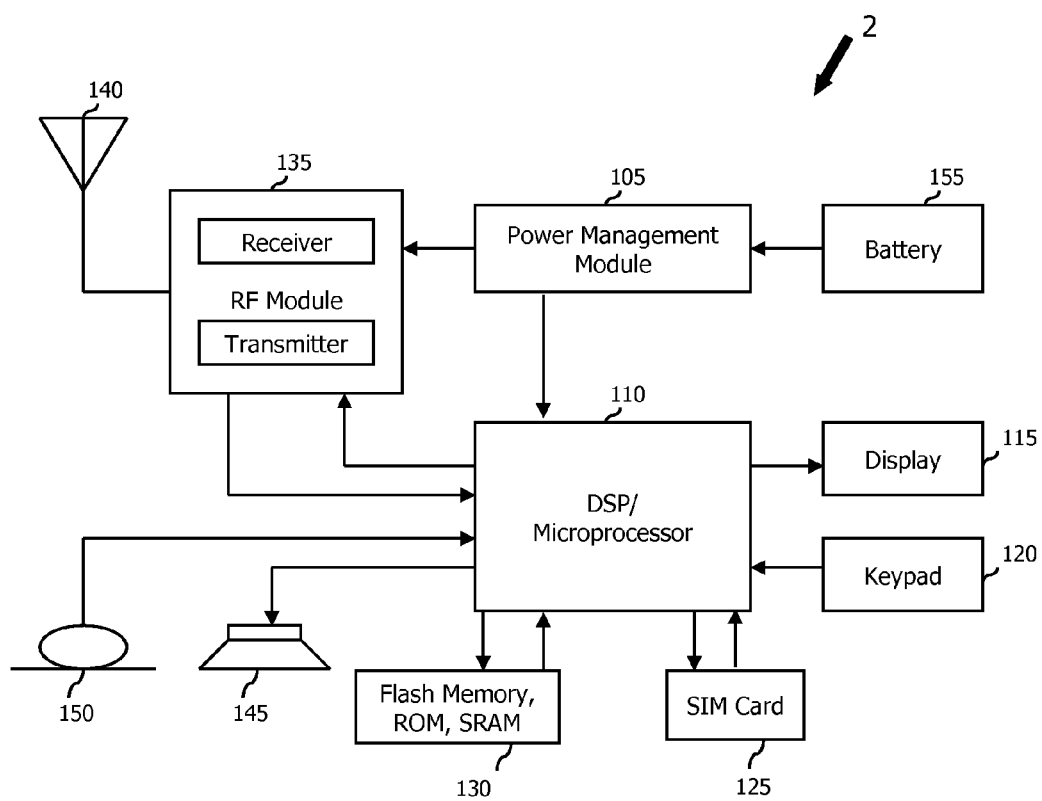
FIG. 7 illustrates a block diagram of a mobile station (MS) or access terminal (AT) according to the present invention.

FIG. 7 illustrates a block diagram of a mobile station (MS) or access terminal 2. The AT 2 includes a processor (or digital signal processor) 110, RF module 135, power management module 105, antenna 140, battery 155, display 115, keypad 120, memory 130, SIM card 125 (which may be optional), speaker 145 and microphone 150.

A user enters instructional information, such as a telephone number, for example, by pushing the buttons of a keypad 120 or by voice activation using the microphone 150. The microprocessor 110 receives and processes the instructional information to perform the appropriate function, such as to dial the telephone number. Operational data may be retrieved from the Subscriber Identity Module (SIM) card 125 or the memory module 130 to perform the function. Furthermore, the processor 110 may display the instructional and operational information on the display 115 for the user's reference and convenience.

The processor 110 issues instructional information to the RF module 135, to initiate communication, for example, transmits radio signals comprising voice communication data. The RF module 135 comprises a receiver and a transmitter to receive and transmit radio signals. An antenna 140 facilitates the transmission and reception of radio signals. Upon receiving radio signals, the RF module 135 may forward and convert the signals to baseband frequency for processing by the processor 110. The processed signals would be transformed into audible or readable information outputted via the speaker 145, for example. The processor 110 also includes the protocols and functions necessary to perform the various processes described herein.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

The foregoing embodiments and advantages are merely exemplary and are not to be construed as limiting the present invention. The present teaching can be readily applied to other types of apparatuses.

The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method of establishing a communication link between a mobile terminal and a network, the method comprising:
   identifying, by the mobile terminal, a first random access preamble group and a second random access preamble group for accessing the network, wherein at least the first or second random access preamble group contains preambles available for random access;
   selecting, by the mobile terminal, at least one preamble from the first random access preamble group or second random access preamble group; and
   requesting, by the mobile terminal, access to the network using the selected at least one preamble,
   wherein each of the available random access preambles is calculated from a plurality of information elements that are related to parameters for random access.

2. The method of claim 1, further comprising receiving information related to the first and second random access preamble groups from the network via system information or a Radio Resource Control (RRC) connection reconfiguration message.

3. The method of claim 2, wherein the information related to the first and second random access preamble groups is included in the RRC connection reconfiguration message when the mobile terminal is in handover.

4. The method of claim 1, wherein the plurality of information elements are at least two of parameters representing a number of non-dedicated random access preambles, a size of the random access preambles in the first or second random access preamble group, a path loss, a threshold for preamble, and a offset.

5. The method of claim 4, wherein there are no available random access preambles in the second random access preamble group if the size of the random access preambles in the first random access preamble group is equal to the number of non-dedicated random access preambles.

6. The method of claim 1, wherein the identifying is performed by a MAC (Medium Access Control) layer of the mobile terminal.

7. A method of establishing a communication link between a mobile terminal and a network, the method comprising:
   setting, by the network, a first random access preamble group and a second random access preamble group for establishing the communication link, wherein at least the first or second random access preamble group contains preambles available for random access; and
   calculating, by the network, each of the available random access preambles based on a plurality of information elements that are related to random access parameters.

8. The method of claim 7, further comprising transmitting information related to the first and second random access preamble groups to the mobile terminal via system information or a Radio Resource Control (RRC) connection reconfiguration message.

9. The method of claim 8, wherein the information related to the first and second random access preamble groups is included in the RRC connection reconfiguration message when the mobile terminal is in handover.

10. The method of claim 7, wherein the plurality of information elements are at least two of parameters representing a number of non-dedicated random access preambles, a size of the random access preambles in the first or second random access preamble group, a path loss, a threshold for preamble, and a offset.

11. The method of claim 10, wherein there are no available random access preambles in the second random access preamble group if the size of the random access preambles in the first random access preamble group is equal to the number of non-dedicated random access preambles.

* * * * *